United States Patent
Kostadinov (10) Patent No.: US 7,263,546 B1
(45) Date of Patent: Aug. 28, 2007

(54) FIELDBUS UPGRADABLE APPARATUS AND METHOD

(75) Inventor: Vladimir Kostadinov, Sharon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 710 days.

(21) Appl. No.: 09/580,160

(22) Filed: May 30, 2000

Related U.S. Application Data (60) Provisional application No. 60/136,253, filed on May 27, 1999.

(51) Int. Cl.
*G06F 15/167* (2006.01)
(52) U.S. Cl. .............................. 709/216; 707/9; 707/10
(58) Field of Classification Search ................ 709/216; 707/10, 9; 711/152; 710/106, 128
See application file for complete search history.

(56) References Cited

U.S. PATENT DOCUMENTS

| | | | | |
|---|---|---|---|---|
| 5,915,094 A | * | 6/1999 | Kouloheris et al. | 395/200.49 |
| 6,006,239 A | * | 12/1999 | Bhansali et al. | 707/201 |
| 6,067,407 A | * | 5/2000 | Wadsworth et al. | 709/224 |
| 6,195,732 B1 | * | 2/2001 | Adams et al. | 711/156 |
| 6,493,804 B1 | * | 12/2002 | Soltis et al. | 711/152 |
| 6,738,388 B1 | * | 5/2004 | Stevenson et al. | 370/465 |

\* cited by examiner

*Primary Examiner*—Jason Cardone
*Assistant Examiner*—Adnan M. Mirza
(74) *Attorney, Agent, or Firm*—Foley Hoag LLP (57) ABSTRACT

A method and apparatus to modify control devices residing on a Fieldbus communications network, without interrupting the operation of the control devices. The control device updating may further be controlled and monitored by a remotely located host that also communicates on the Fieldbus network. The control device may comprise at least two distinct memory areas, wherein at least one memory area must be active, and at least one memory area must be inactive. Active memory areas provide the control device microprocessor operating system with executable instructions or data. The host downloads new executable instructions or data to inactive memory areas, with associated data entry points, during unscheduled communications periods wherein data input/output is not being performed between the control device and the host or another control device. Upon a full data transfer and proper verification of the new data, the host may issue an activation command that causes a selector device to activate the previously inactive memory area by directing the microprocessor to the entry points of the newly downloaded executable instructions or data. The memory activation must occur while the microprocessor is not performing application execution, application input/output, or application communications. By timing the memory activation in this manner, the microprocessor may be redirected to the newly downloaded executable instructions or data without microprocessor interruption.

20 Claims, 4 Drawing Sheets

FIELDBUS UPGRADABLE APPARATUS AND METHOD

CLAIM OF PRIORITY

This application claims priority to provisional application U.S. Ser. No. 60/136,253, entitled FIELDBUS UPGRADABLE DEVICE, and filed on May 27, 1999, naming VLADIMIR KOSTADINOV as inventor, the contents of which are herein incorporated by reference.

BACKGROUND OF THE INVENTION (1) Field of the Invention

The present invention relates generally to communications systems, and more particularly to utilizing communications systems for uninterruptive software upgrading.

(2) Description of the Prior Art

In the manufacturing and process control industries, there is a continuing effort to eliminate older, centralized plant control strategies, in favor of standard protocols. This type of control provides true device interoperability, enhanced field-level control, and reduced installation costs.

The inherent modularity and intrinsic software reliance of modern manufacturing and process control systems allows a platform wherein distributed control may be best utilized. Communications protocols such as the commonly known Fieldbus technology allow for the interconnecting of measurement and control equipment such as sensors, actuators, and controllers. Examples of some Fieldbus technologies include Profibus™ and Foundation™. Fieldbus is an all-digital, serial, two-way communications system that serves as a Local Area Network (LAN) for instruments in process control and manufacturing automation applications. Fieldbus facilitates the distribution of the control application across the network. Control through the network is particularly advantageous when the devices or processes to be controlled are physically remote from a central control station.

Although the systems, sensors, and devices of such manufacturing and process systems are modular, and there are communications standards for interconnecting components of such systems, there is currently no method or apparatus for allowing device, system, or sensor software upgrades from remote locations without interrupting the control system.

What is needed is a method and apparatus that facilitates uninterrupted and remote upgrade of specified control system components.

SUMMARY OF THE INVENTION

It is one aspect of the present invention to provide a method and system for utilization with the well-known Fieldbus communication protocol, that allows uninterrupted software upgrading of remote, microprocessor controlled devices that exist on the Fieldbus network.

In a preferred embodiment, the Fieldbus network comprises a plurality of control devices, wherein control devices may be input devices, output devices, or input/output devices. Each control device may be configured for Fieldbus communications. Each control device also comprises at least two memory areas within which executable software and data may reside, wherein at least one memory area may be active and at least one memory area may be inactive. Memory areas may further comprise multiple memory segments. Each control device additionally comprises a selector device that specifies to the microprocessor those memory areas that are active. In a preferred embodiment, the selector device directs the control device microprocessor to the active memory areas during the microprocessor operating system cycle.

It is another aspect of the present invention to allow a Fieldbus communications system wherein a host computer configured within the Fieldbus network may provide software upgrades and other control to remote control devices through the network. In an embodiment, software upgrades are performed without interrupting the control device processor, by issuing a Fieldbus compatible command that indicates to the control device microprocessor that a new software version is available for the designated control device. The respective microprocessor routes the software upgrade to a presently inactive memory area within the designated control device that shall be designated the new memory area. Such transfer occurs during otherwise unscheduled communications periods to avoid interruption to the network or the control device. Similarly, the remotely located control device microprocessor performs the transfer without interrupting the presently executing application or data functions in the control device. The microprocessor also verifies the new software. The new memory area may be activated during a microprocessor idle period by directing the microprocessor to the new software, thereby providing a seamless transition to the new memory area and hence the new software.

It is another aspect of the invention to provide a mechanism whereby the host may return the microprocessor to a previously active memory area within a designated control device.

It is yet another aspect of the invention to utilize new memory areas for increasing the control device functionality. The number of active memory areas may increase as functionality is increased.

Other objects and advantages of the present invention will become more obvious hereinafter in the specification and drawings.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

To provide an overall understanding of the invention, certain illustrative embodiments will now be described; however, it will be understood by one of ordinary skill in the art that the systems described herein can be adapted and modified to provide systems for other suitable applications and that other additions and modifications can be made to the invention without departing from the scope hereof.

Figure 1:
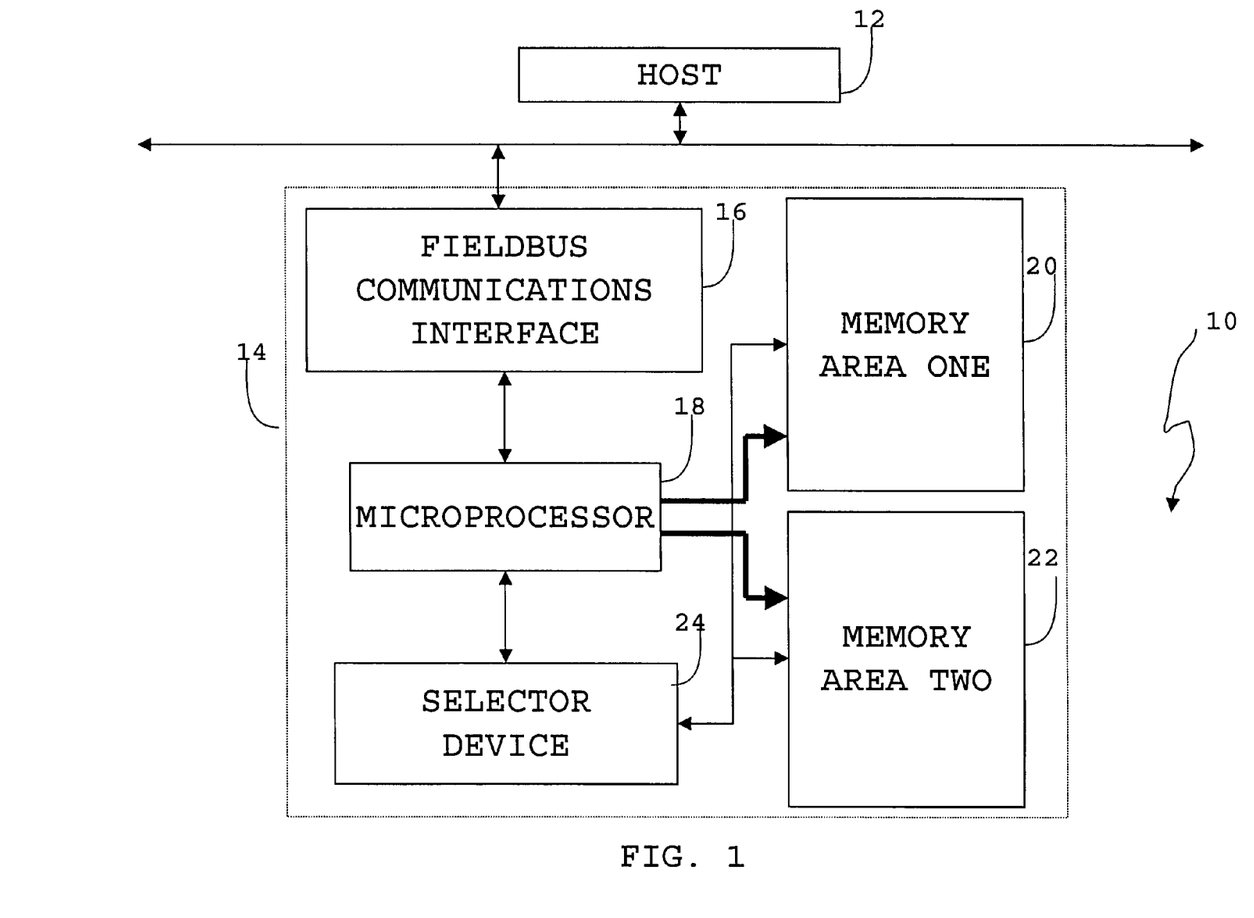
FIG. 1 is a representative block diagram of a Fieldbus communications network segment displaying a host and a single control device.

Referring now to FIG. 1, there is shown a block diagram of a system 10 that incorporates an embodiment of the invention. The FIG. 1 system 10 comprises a host 12 that is configured for communications using the well-known Fieldbus communications protocol. The host 12 can be implemented using a digital computer system that may be any microprocessor-based system including a computer workstation, such as a PC workstation, SUN workstation, handheld or laptop computer, that comprises a program for organizing and controlling the digital computer system to operate according to the invention. Additionally and optionally, the microprocessor-based system can be equipped for processing multimedia data, and can be, for example, a conventional PC computer system with a sound and video card. The computer system can operate as a stand-alone system when not operating as part of a networked computer system. The host may therefore be any microprocessor-based device that is designated to perform the functionality herein to uninterruptively upgrade software on a specified control device, such specified control device including, for example, a field device such as a controller, transmitter, or actuator.

The host 12 may provide and receive remote command and control information to and from a plurality of control devices residing on the network. FIG. 1 displays a representative control device 14. The host 12 and control device 14 may not be co-located on the same Fieldbus segment, and communications between the host 12 and control device 14 may be coupled through various Fieldbus and other network segments, that shall be referred to herein collectively as the Fieldbus communications network.

Control devices may be input devices, output devices, or input/output devices as commonly known in the art. As indicated by FIG. 1, the control device comprises a Fieldbus communications interface 16 to receive and transmit commands and data across the Fieldbus network, at least one microprocessor 18 to execute control device resident applications and communicate with the host and other control devices, at least two memory areas 20, 22 for storing executable programs and/or data that may be accessed by the microprocessor 18, and a selector device 24 interfaces the microprocessor 18 to executable instructions or data in the memory areas 20, 22.

In a preferred embodiment, the memory areas 20, 22 may be flash memory, although other memory devices may be utilized without departing from the invention. Each memory area 20, 22 may additionally be continuous, partitioned, or segmented. The FIG. 1 memory areas 20, 22 therefore merely represent logically separate memory areas, and each memory area 20, 22 may be comprised of memory across multiple segments, etc.

For the purposes of this invention, all references to the microprocessor 18 shall be understood to refer to the embedded software or operating system that forms a microprocessor operating system, wherein such an operating system is commonly known for scheduling and executing applications, allocating resources, etc. In a preferred embodiment, the microprocessor 18 repeatedly performs a scheduled series of tasks during a fixed time period. The tasks are identified to the microprocessor 18 through entry points that specify a memory area, wherein the memory area comprises executable instructions or data to perform and/or complete the task. In an embodiment, the memory area may comprise executable instructions or data relating to a control device application.

For purposes of this invention, each such repetitive fixed time period wherein the microprocessor performs the scheduled tasks shall be defined as a macrocycle. Additionally, any time within the macrocycle during which the microprocessor is not executing an application, performing application-dependent input/output, or performing application related communications, shall be defined as an idle period.

As FIG. 1 indicates, the microprocessor 18 may access the memory areas 20, 22 in two manners for two distinct purposes. The microprocessor connection to the memory areas 20, 22 through the selector device 24 represents the selector device functionality to supply the microprocessor 18 with entry points for application executable instructions or data, wherein such application instructions or data resides in the memory areas 20, 22. For the purpose of this invention, such activity shall be defined as "executable" activity, wherein the microprocessor 18 executes the instructions or data residing in the memory areas 20, 22.

Alternately, the microprocessor 18 may directly access the memory areas 20, 22 (i.e., without selector device 24 intervention) to perform functions unrelated to application or data execution. Examples of such functions include data integrity checks, data loading or unloading, etc. For purposes of this invention, such activity shall be defined as "processing" activity, wherein the microprocessor 18 processes the memory area contents without executing the instructions or data therein.

The selector device 24 may designate an active memory area(s) from an inactive memory area(s) for the microprocessor 18. For the purposes of this invention, active memory areas shall be defined as the memory areas that the microprocessor 18 is directed to, by the selector device 24, to obtain executable instructions or data. In a preferred embodiment, the selector device 24 activates a memory area merely by providing the microprocessor 18 with the entry points to the memory area.

For purposes of this invention, all memory areas other than the active memory areas shall be known as inactive memory areas. The microprocessor 18 does not execute instructions or data from any inactive memory area, however the microprocessor may process the inactive memory area contents for data integrity, perform data downloading, etc.

For purposes of this invention, a new memory area shall be defined as an inactive memory area to which upgradeable executable instructions (e.g., an application) or data shall be directed, wherein such upgradeable instructions or data shall also be referred to collectively as new data. New data may work independently, to the exclusion of, or together with, existing data in active memory areas.

In a preferred embodiment, the selector device 24 is incorporated as a software module that interacts with the microprocessor 18 and may be implemented through software using higher-level languages such as C++ or Java, or optionally microcode or machine level instructions; however, those with ordinary skill in the art shall recognize that the selector device 24 may be implemented in hardware without departing from the scope of the invention herein.

Figure 2:
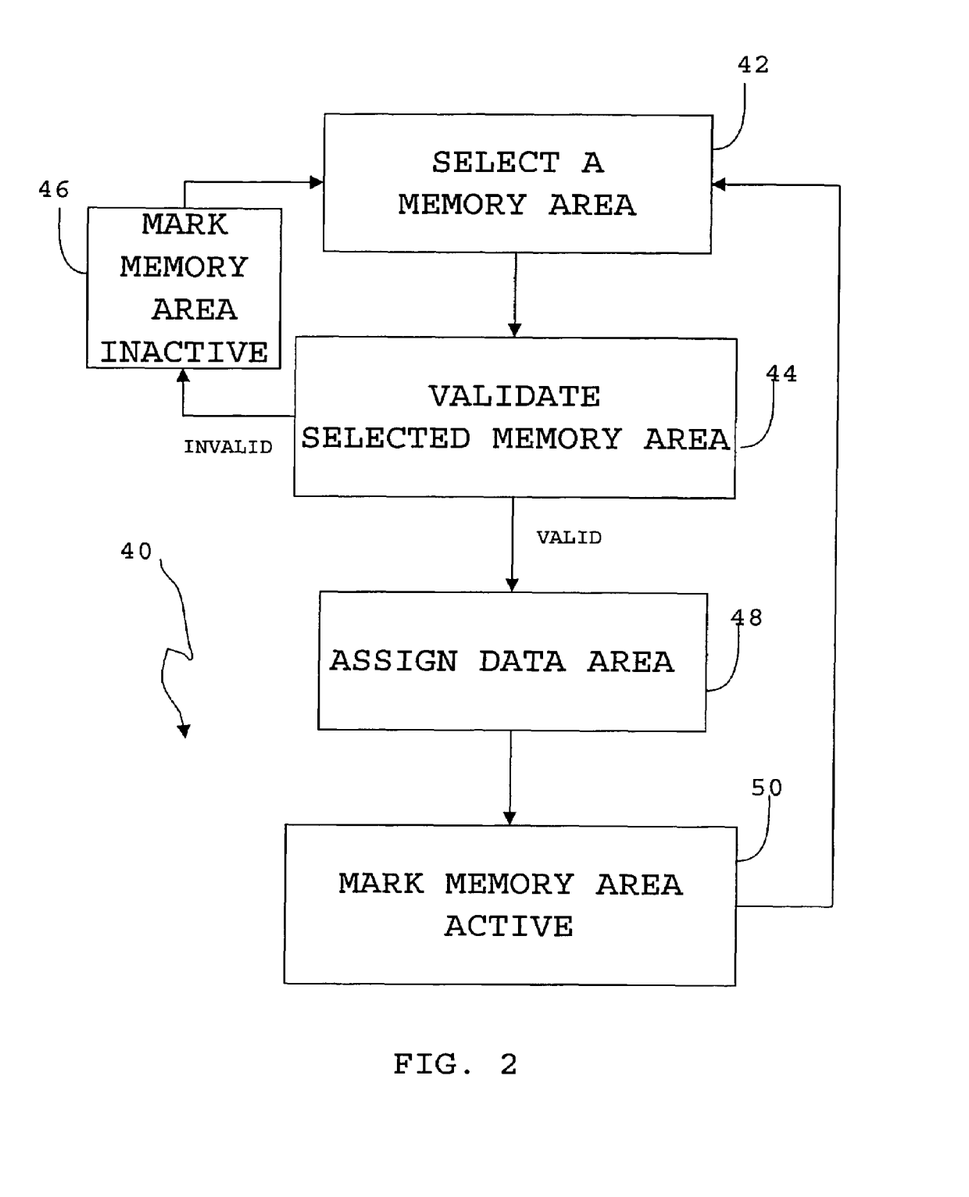
FIG. 2 presents a control device initialization methodology.

Referring now to FIG. 2, there is shown a representative process 40 by which a control device may be initialized. In an embodiment presented in FIG. 2, upon initialization, the control device cycles through all control device memory areas and sets to active all memory areas that are verified through the verification process. In such an embodiment, the control device microprocessor selects, in a logical order, a memory area 42. The microprocessor may then verify 44 the memory area contents using such well-known techniques as CRC computations, although the invention is not limited by such verification technique. If the verification fails, the memory area may be marked as inactive 46, and another memory area is selected 42. In a preferred embodiment, such inactive designation 46 may be a passive activity since all memory areas other than the active memory area may be by default, inactive; however, alternate embodiments may otherwise designate inactive memory areas using alternate techniques without departing from the invention herein.

Alternately, when a memory area is properly verified, a data area may be assigned 48 within the memory area, and the memory area may be designated active 50. The next memory area in the logical order may then be selected 42, until all such memory areas are designated active or inactive.

Although FIG. 2 presents an initialization process for one embodiment wherein multiple memory areas may be active, alternate embodiments may utilize different initialization processes. In applications wherein only one memory area may be allowed to be active, such memory area may be "selected" 42 by the respective selector device or microprocessor that may retain or preserve the active and inactive memory area status data from a previous session. In yet another embodiment, the host may store the location of the active memory areas for each control device, and transmit, using the Fieldbus protocol, the active memory address(es) to the respective control device upon initialization.

Figure 3:
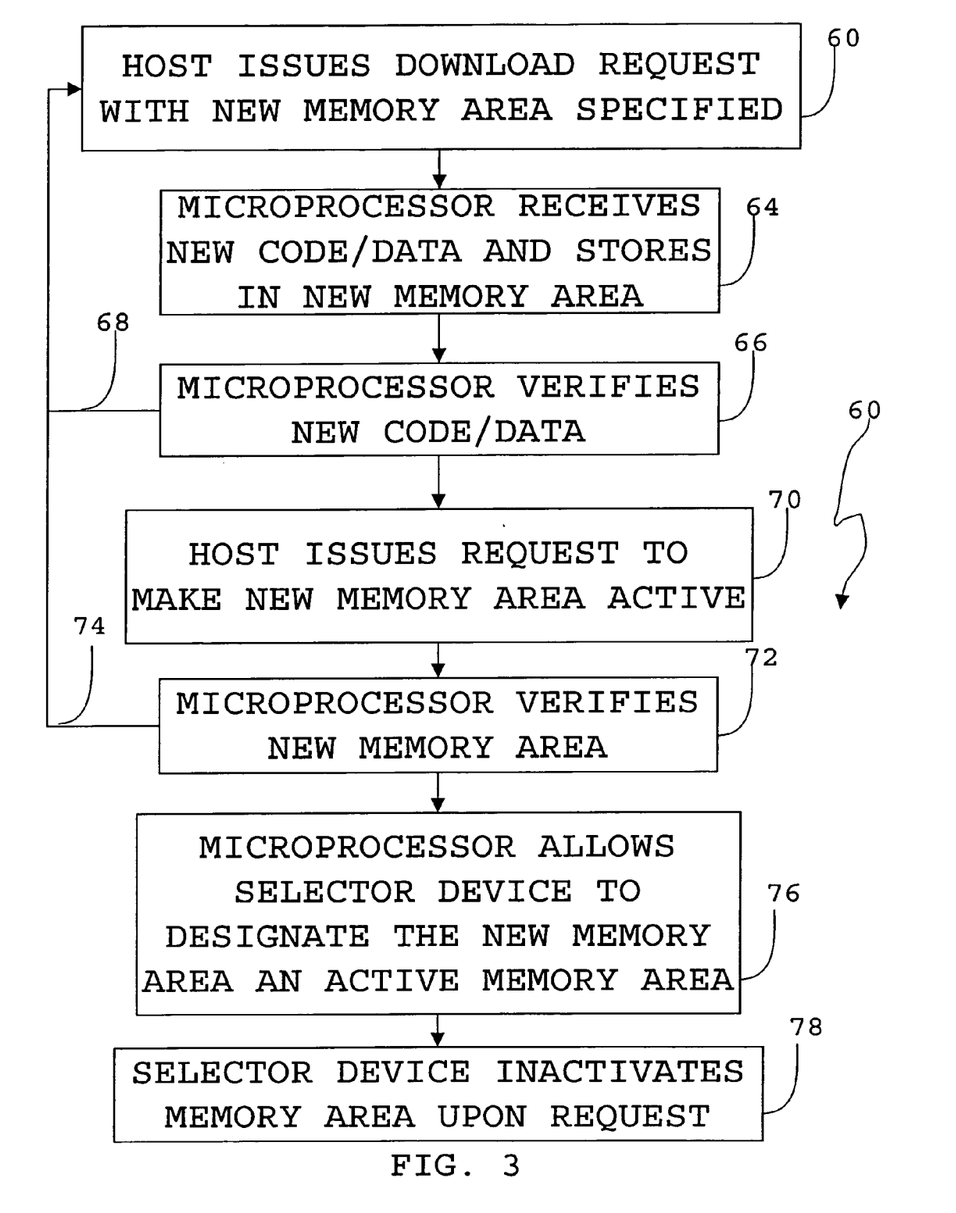
FIG. 3 diagrammatically represents the logic for altering control device memory; and, FIG. 4 presents the microprocessor operating system and unscheduled communications timelines.

Referring now to FIG. 3, there is shown a process 60 wherein new executable instructions or data may be provided to a designated control device. In the FIG. 3 embodiment, updating the control device comprises downloading new data. The host may request an upgrade to the control device, and the request may be communicated between the host and control device using Fieldbus protocols. As FIG. 1 indicates, communications between the host and the control device require communication through the Fieldbus interface, that thereafter interacts with the microprocessor that processes the commands. Such communications may occur during otherwise unscheduled communications periods between the host and control device, wherein unscheduled communications periods may be defined as those time periods during which the control device microprocessor may not be previously scheduled to exchange input/output data relating to applications executing on the control device. Such previously scheduled input/output periods may comprise communications between the control device and the host, or between the control device and another control device.

The host may identify the control device through a user-interface or other interactive mechanism that allows a host operator to designate a specific control device. In a preferred embodiment, the host comprises a user interface that similarly indicates respective active and inactive memory areas for specified control devices. The host may store information regarding the present active memory areas for a specified control device and display such information to the host user, or alternately, the host may poll the selector device of the specified control device, using the Fieldbus protocol, to ascertain the present active memory areas. In yet another embodiment, the selector device may provide the host with the active memory area designation upon completion of the control device initialization processing as indicated by FIG. 2.

In a preferred embodiment, the host user interface may allow a host operator to specify an inactive memory area as a target for the new data. Such user interface may also allow the host operator to specify the new data. Referring back to FIG. 3, the host may then issue, using Fieldbus communications protocols, a data download request 62 that may be received by the specified control device microprocessor to cause the new memory area identifier and new data to be transmitted to the control device. In a preferred embodiment, the host also transfers the new memory area entry points, wherein the entry points shall direct the microprocessor to the executable instructions or data in the new memory area. Such host requests and transfers are also performed during previously defined unscheduled communications intervals.

Upon receipt 64 of the download request and new memory area designation, new data, and new memory area entry points, the microprocessor may direct the new data to the new memory for storage. The microprocessor may also direct the new memory entry points to the selector device for storage. The host may then issue a verification command that may cause the control device microprocessor to verify 66 the new data in the new memory area, wherein such verification may be, for example, a CRC computation, but the invention herein is not limited to such verification method. In an embodiment, the microprocessor stores the result of such memory verification in the selector device. In a preferred embodiment, the microprocessor functions of receiving 64, redirecting 64, and verifying 66 the new data, may be performed in parallel processes with the presently executing applications in the active memory areas. Such functions may therefore be performed at any time in the microprocessor timeline, other than the during scheduled input/output network communications intervals.

If a proper verification of the new memory area is not achieved 68, the host may issue another download request, again designating a new memory area and the new data. The same inactive memory area may be utilized, or the host may request a different memory area if more than one inactive memory areas exist.

Alternately, upon proper verification of a memory area, the control device microprocessor may inform the host of the proper verification, wherein the host may request that the new memory be designated an active memory 70.

The control device microprocessor, upon receiving a request from the host to change the status of an inactive (i.e., new) memory area to active, may interrogate the verification status of the new memory 72. Alternately, the microprocessor may interrogate whether entry points are received for the new memory area. If the new memory area is not verified, or entry points do not exist, the microprocessor may reject 74 the host request to change the active memory designation. Alternately, if the new memory is verified and entry points are stored, the host's request may be granted, and the microprocessor may inform the selector device that the new memory area may be activated 76.

Depending upon, for example, whether the new data comprises cooperative as compared to replacement data, the host may issue a request to inactivate a presently active memory area 78. In some embodiments, activating and inactivating memory areas may require proper coordination and timing to achieve the desired microprocessor direction via the selector device-provided entry points.

In one embodiment wherein the system is initialized through the cyclic process depicted in FIG. 2, memory inactivation may cause the memory area to purposefully fail subsequent verification checks. In such a system, re-activating the content of that memory segment may require a new download of the older executable instructions or data. Alternately, the inactivation process may be reversible with another command from the host, thereby preventing the necessity for another data download.

In embodiments wherein only one memory area can be active, the inactivation process may be simplified and may be implemented using default logic embedded in software or hardware. All such activation and inactivation methods and processes may be implemented in various manners without departing from the scope of the present invention.

The method of indicating active or inactive memory areas relates also to the ability to return to previous versions of executable instructions or data. For example, if a system comprises N memory areas, wherein only one memory area may be active, the system may be implemented such that as many as (N−1) versions of executable instructions or data may be stored in inactive memory areas. Such configuration may also allow rapid transition between these versions of executable instructions or data by issuing a host request with the new memory area designation.

Alternately, when multiple memory areas are allowed to be active, the present invention provides a structure wherein functionality may be easily added or eliminated. Modular upgrades may also be readily achieved in such an embodiment, wherein one memory area with a specific functionality may be upgraded to the exclusion of other active memory areas.

Figure 4:
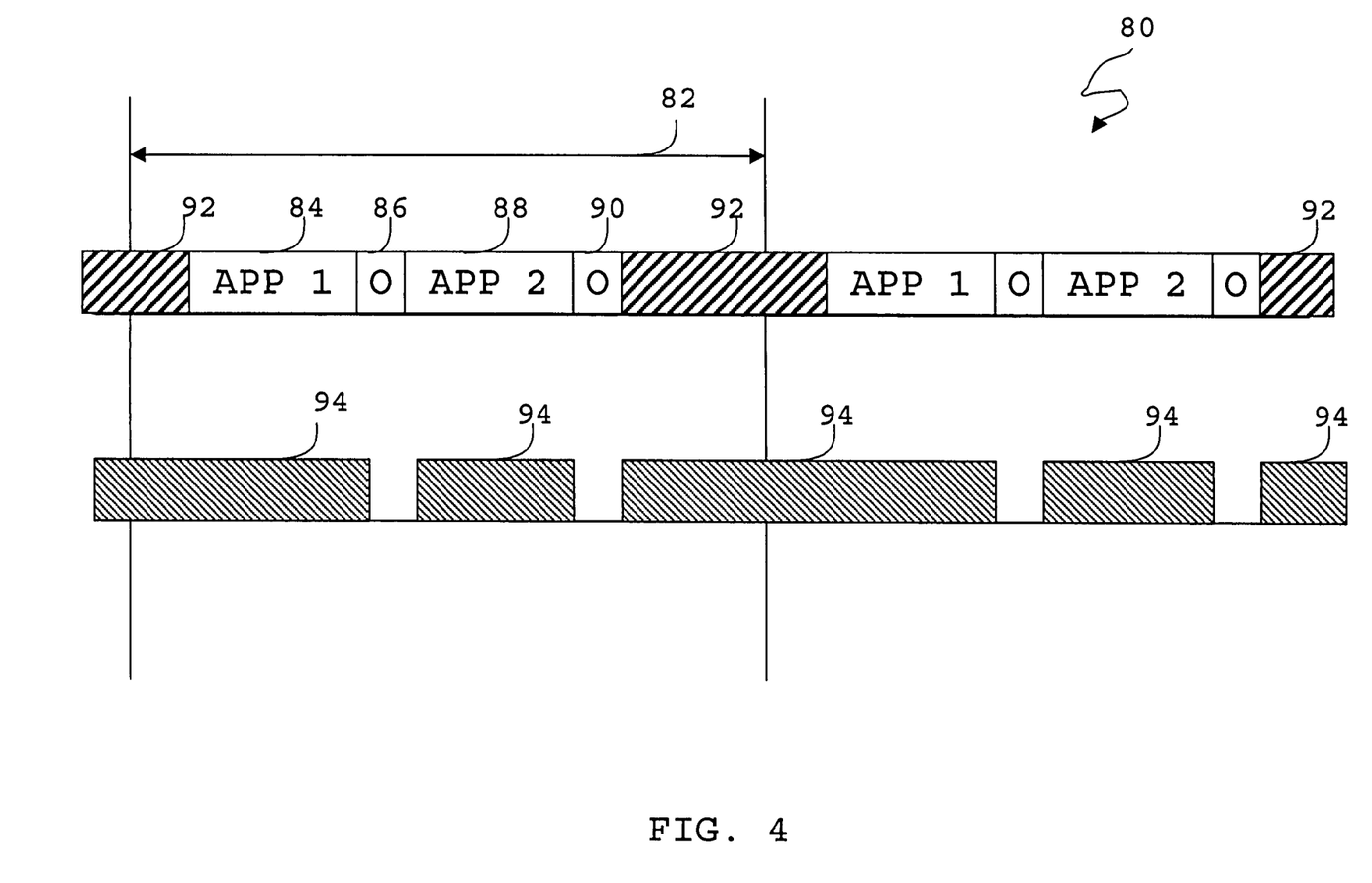

Referring now to FIG. 4, there is shown two timelines 80 indicating a representative microprocessor operating system timeline, previously defined as a macrocycle, and a corresponding unscheduled communications timeline. As mentioned previously, the macrocycle 82 may be viewed as a repeatable interval, the duration of which may be designed to allow execution of all control device applications and input/output functions, with consideration for the overall communications bandwidth during the input/output functions. For example, during each representative macrocycle of FIG. 4, the microprocessor operating system executes a first application 84, wherein such first application is followed immediately by a first input/output interval 86. During the first input/output interval 86, the control device may transfer data relating to the first application, using the Fieldbus protocol. Such communications intervals 86 are therefore known as scheduled communications intervals, and may be between the control device and the host, or between the control device and another control device. Upon completion of the first input/output interval 86, the microprocessor executes a second application 88, wherein such second application 88 is followed in time by a second input/output interval 90, such second input/output interval 90 also being a scheduled communications interval. Although the representative embodiment of FIG. 4 indicates only two applications, the invention herein is not limited by the number of applications executed on a control device during a given macrocycle.

Referring again to FIG. 4, the selector device may activate or inactivate memory areas, or change the entry points, at any time during the macrocycle that the microprocessor operating system is not executing applications or utilizing application dependent data. Such periods in the macrocycle are indicative of the previously defined idle periods 92. During these idle periods 92, the selector device may incorporate the entry points to the new memory area such that during the microprocessor's next scheduled application execution, the new entry points may direct the microprocessor to the new data. By altering the microprocessor entry points during intervals wherein the microprocessor is not performing application or application-dependent processing, the transition to the new data may occur without interrupting the microprocessor functionality or processing timeline.

As mentioned previously, activating a memory area may require inactivating another memory area, and such activation/inactivation may require coordination. Inactivation, just as activation, must be performed during the idle periods 92, when the microprocessor is neither scheduled for application execution or application input/output. Such activation/inactivation may require several idle periods to achieve complete conformance. In an embodiment, the host may extend an idle period (i.e., prevent the next macrocycle from commencing) to effectuate a memory area activation or inactivation.

Alternately, data transfers from the host computer to the new memory area, or any commands or requests from the host, may be scheduled during the unscheduled communications periods 94. As defined previously, unscheduled communications periods 94 comprise any macrocycle time interval during which the microprocessor is not performing input/output with the host or another control device. Unscheduled communications therefore comprise all time within the processing interval that is not a scheduled communications interval.

As with any communications system, data rates must be considered when scheduling events. Depending upon the data rates and the data amount transferred to a new memory area, more than one macrocycle may be required to download the data; therefore, the download of executable instructions or data to a new memory area may occur during one macrocycle, while the verification of such new memory may not occur until several macrocycles after such download begins. Further, altering the microprocessor operating system entry points may require a period greater than a single idle period 92, thereby delaying the activation of a new memory area for several macrocycles.

In one embodiment where several control devices may be upgraded, the upgrades may be coordinated to occur at the same time. In such an embodiment, new data may be downloaded to all control devices, and respective microprocessors may be redirected to respective new data memory areas to achieve a synchronized or otherwise controlled upgrade.

In one embodiment, the microprocessor redirection for one or more control devices may be scheduled to a certain time or event, without departing from the invention. In such an embodiment, one or more control devices may comprise new data in an inactive memory area. The host may then monitor at least one parameter, wherein the parameter(s) may relate to control devices, and upon the particular parameter(s) attaining a predetermined value, the host may issue a request to redirect the microprocessor on one or more control devices.

The advantage of the present invention over the prior art is that control devices within a Fieldbus network may be remotely updated with new executable instructions or data without disturbing the operation of the control device.

What has thus been described is a method and apparatus to modify control devices residing on a Fieldbus communications network, without interrupting the operation of the control devices. The control device updating may further be controlled and monitored by a remotely located host that also communicates on the Fieldbus network. The control device may comprise at least two distinct memory areas, wherein at least one memory area must be active, and at least one memory area must be inactive. Active memory areas provide the control device microprocessor operating system with executable instructions or data. The host downloads new executable instructions or data to inactive memory areas, with associated data entry points, during unscheduled communications periods wherein data input/output is not being performed between the control device and the host or another control device. Upon a full data transfer and proper verification of the new data, the host may issue an activation command that causes a selector device to activate the previously inactive memory area by directing the microprocessor to the entry points of the newly downloaded executable instructions or data. The memory activation must occur while the microprocessor is not performing application execution, application input/output, or application communications. By timing the memory activation in this manner, the microprocessor may be redirected to the newly downloaded executable instructions or data without microprocessor interruption.

Although the present invention has been described relative to a specific embodiment thereof, it is not so limited. Obviously many modifications and variations of the present invention may become apparent in light of the above teachings. For example, the selector device functionality may be performed in hardware or software. The selector device may be incorporated within the microprocessor or independent of the microprocessor operating system. The Fieldbus network may contain any number of control devices. Each control device may have a different macrocycle length during which a varying number of applications may be executed. Depending on the network size, there may be more than one host. The host and the control devices may reside on different Fieldbus segments, wherein such segments may be connected through otherwise compatible network software or hardware. The interactions and scheduling between the microprocessor and the selector device may be embedded in either system or otherwise shared between the systems. Wherein multiple memory areas may be active and multiple memory areas are inactive, multiple memory areas may be updated and all corresponding entry points changed within the same selector device modification.

Many additional changes in the details, materials, steps and arrangement of parts, herein described and illustrated to explain the nature of the invention, may be made by those skilled in the art within the principle and scope of the invention. Accordingly, it will be understood that the invention is not to be limited to the embodiments disclosed herein, may be practiced otherwise than specifically described, and is to be understood from the following claims, that are to be interpreted as broadly as allowed under the law.

I claim:

1. A method for modifying processing on at least one control device controlling operation of process control equipment, the method comprising: transferring data from a remote host device to the at least one control device during unscheduled communications periods and without interrupting operation of the at least one control device, the remote host device and the: at least one control device being coupled through a Field bus communications network; storing the transferred data to a respective inactive memory area; monitoring at least one parameter; and, communicating, when the parameter attains a specified value, a command to redirect at least one control device microprocessor, during an idle period of the at least one control device microprocessor, to execute the stored data in the inactive memory area to modify the processing on the at least once control device.

2. A method according to claim 1, further comprising verifying the stored data in the respective inactive memory area.

3. A method according to claim 1, wherein redirecting the at least one control device microprocessor comprises providing the at least one control device microprocessor with entry points to the stored data.

4. A method according to claim 1, wherein transferring data comprises transmitting entry points.

5. A method according to claim 1, wherein transferring data comprises transmitting executable instructions.

6. A method according to claim 1, wherein transferring data comprises synchronizing data transmissions between the host device and the at least one control device to avoid interference with scheduled communications.

7. A method according to claim 1, further comprising:
selecting a respective at least one active memory area; and,
inactivating the respective selected active memory area such that the at least one control device microprocessor does not execute data in the respective selected active memory area.

8. A method according to claim 1, wherein redirecting the at least one control device microprocessor comprises issuing an upgrade request from the host device to the at least one control device.

9. A method according to claim 8, wherein issuing an upgrade request comprises coordinating at least one upgrade command from the host device to the at least one control device.

10. A system for modifying processing on at least one control device, the system comprising: a remote host device coupled through a Field bus communications network to the at least one control device and configured to transfer data to the at least one control device during unscheduled communications periods between the at least one control device and control equipment of at least one process controlled by the at least one control device and without interrupting operation of the at least one control device; at least one control device active memory area and at least one control device inactive memory area; at least one control device microprocessor to execute instructions and data in the at least one active memory area; and, a control device selector module to direct the at least one control device microprocessor to the at least one active memory area, the selector module further comprising a scheduling module to monitor at least one parameter and, when the parameter attains a specified value, to redirect the at least one control device microprocessor during microprocessor idle periods to modify the processing on the at least one control device.

11. A system according to claim 10, wherein the selector module comprises entry points to direct the at least one control device microprocessor.

12. A system according to claim 10, wherein the at least one control device microprocessor comprises a memory verification module.

13. A system according to claim 10, wherein:
the at least one active memory area comprises flash memory; and,
the at least one inactive memory area comprises flash memory.

14. A system according to claim 10, wherein the remote host device comprises:
a Fieldbus communications module to access the Fieldbus communications network;
a control module to receive, transmit, and display commands and data between the Fieldbus communications network and a host device user; and,
a control device communications module to transmit and receive commands and data between the host device and the at least one control device.

15. A system according to claim 14, wherein the control module further comprises a user interface.

16. A system according to claim 10, wherein the host device is a microprocessor-based device.

17. A system according to claim 10, wherein:
the active memory data comprises executable instructions and data; and,
the inactive memory data comprises executable instructions and data.

18. A method of implementing a software upgrade for a control device, the method comprising:
transferring, without interrupting operation of the control, device, software upgrade data from a remote host device to the control device during unscheduled communications periods between the control device and control equipment of at least one process controlled by the control device, the remote, host device and the control device being coupled through a Field bus communications network;
storing the upgrade data to a respective inactive memory area;
monitoring at least one parameter: and,
communicating, when the parameter attains a specified value, a command to redirect at least one microprocessor of the control device, during an idle period of the at least one microprocessor, to execute the stored upgrade data in, the inactive memory area to implement the software upgrade for a next active period of the microprocessor.

19. A method according to claim 18, wherein:
transferring upgrade data comprises transmitting executable instructions and entry points to the instructions; and
redirecting the at least one microprocessor comprises providing the at least one microprocessor with the entry points.

20. A method for modifying processing on at least one control device, the method comprising:
transferring data from a remote host device to the at least one control device without interrupting operation of the at least one control device and during unscheduled communications periods between the at least one control device and control equipment of at least one process controlled by the at least one control, device, the remote host device and the at least one control device being coupled through a Field bus communications network;
storing the transferred data to a respective inactive memory area;
monitoring at least one parameter; and,
communicating, when the parameter attains a specified value, a command to redirect at least one control device microprocessor during an idle period to execute the stored data in the inactive memory area to modify the processing on the at least one control device, the idle period including a period when the microprocessor is not actively controlling the control equipment and when the microprocessor is not actively processing data from the control equipment, the microprocessor implementing the modified processing for a next active period of the microprocessor with respect to the control equipment.

* * * * *